No. 800,326. PATENTED SEPT. 26, 1905.
A. E. SCHUCHERT & C. OSKAMP.
BAKER'S TRIMMER.
APPLICATION FILED NOV. 14, 1904.
2 SHEETS—SHEET 1.
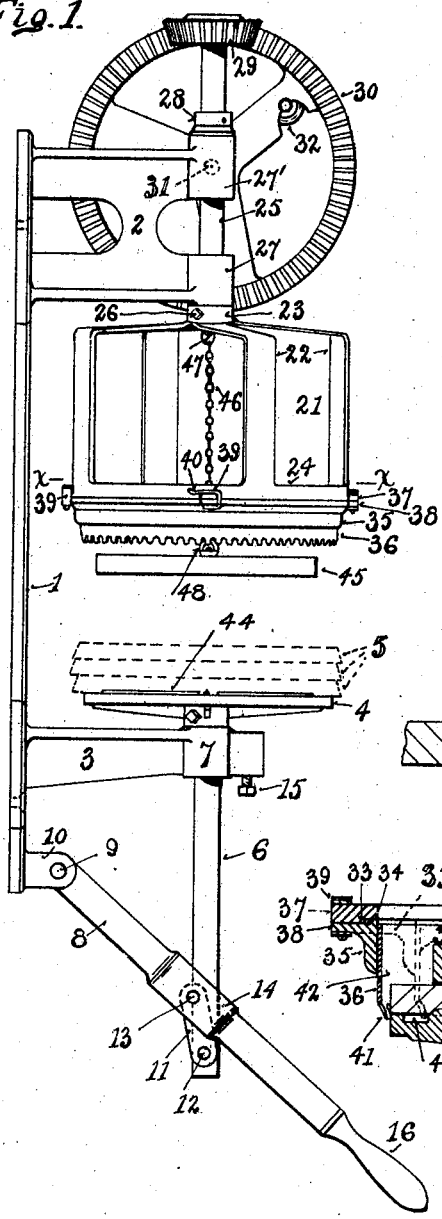
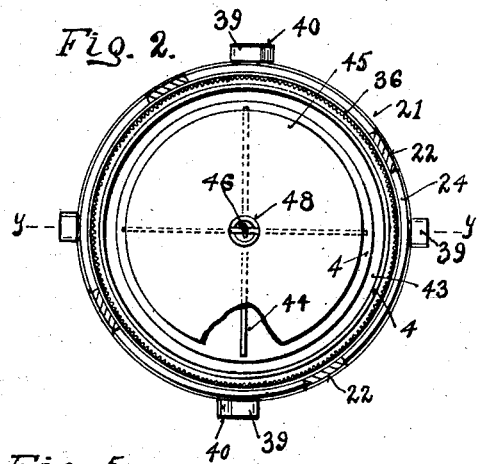
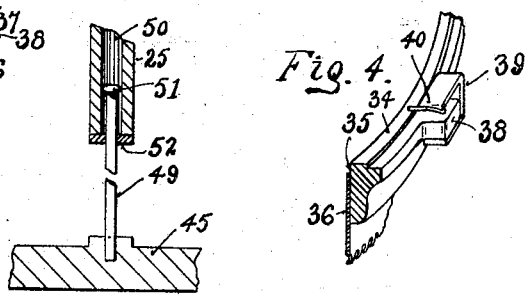
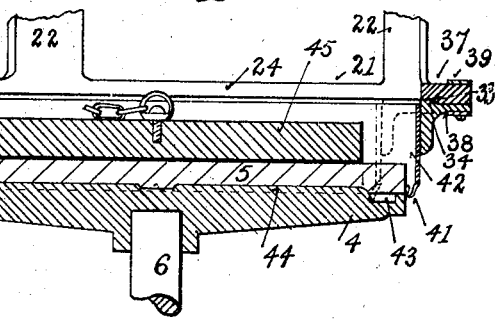
Witnesses:
Theodore C. Jung.
Fred Abel.
Inventors:
Albert E. Schuchert,
Clemens Oskamp,
by A. F. Herbslet, their atty.

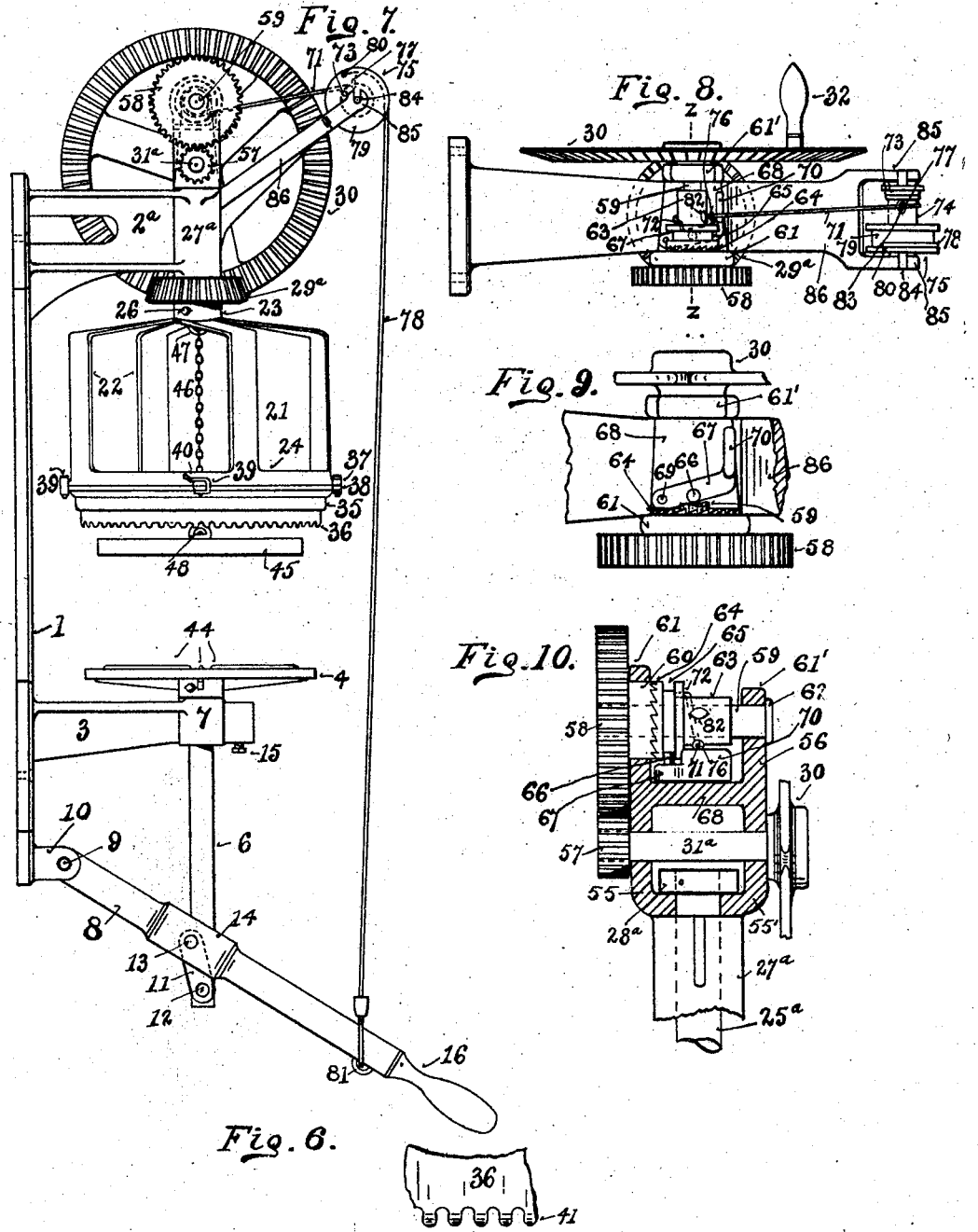

UNITED STATES PATENT OFFICE.

ALBERT E. SCHUCHERT AND CLEMENS OSKAMP, OF CINCINNATI, OHIO.

BAKER'S TRIMMER.

No. 800,326. Specification of Letters Patent. Patented Sept. 26, 1905.

Application filed November 14, 1904. Serial No. 232,685.

*To all whom it may concern:*

Be it known that we, ALBERT E. SCHUCHERT and CLEMENS OSKAMP, citizens of the United States, residing at Cincinnati, in the county of Hamilton and State of Ohio, have jointly invented certain new and useful Improvements in Bakers' Trimmers, of which the following is a specification.

It is the object of our invention to provide a new and useful bakers' trimmer especially adapted for trimming the edges of cake and similar articles, so as to provide an even edge therefor and to trim the layers, blanks, or cake to uniform size.

Our invention is especially useful in trimming the layers of so-called "jelly" or "layer" cakes to make the layers of uniform size, so that when placed one above the other they may have an even edge for receiving the icing, coating, or ornamentation thereon, the edges after being trimmed being vertically straight throughout the various layers placed one above the other, thus providing economy in the coating, as there are no spaces to be filled, and giving a smooth finish.

The invention will be readily understood from the following description and claims and from the drawings, in which—

Figure 1 is a side elevation of our improved device. Fig. 2 is a horizontal section on the line $x$ $x$ of Fig. 1, partly broken away. Fig. 3 is a vertical section on the line $y$ $y$ of Fig. 2, showing the table and cutter in adjacent positions. Fig. 4 is a detail in perspective, showing a portion of the cutter-ring. Fig. 5 is a detail in central vertical section, showing a modification of the swiveling connection of the weighting-plate. Fig. 6 is a detail of the cutter-blade in side elevation. Fig. 7 is a side elevation of a modification of our improved device, showing power connection for automatically raising the table. Fig. 8 is a plan view of the power mechanism for the same. Fig. 9 is a plan view in detail of the power mechanism, partly broken away, showing the shifting-lever for the clutch; and Fig. 10 is a vertical section of the power mechanism for the table, taken on the line $z$ $z$ of Fig. 8.

1 is the column or frame, from which brackets 2 3 project.

4 is a table for receiving the layers, blanks, or cake (shown at 5) to be trimmed. In the form shown the table is capable of being reciprocated by being mounted on a shaft 6, slidable up and down in a bearing 7 on the bracket 3. A lever 8 is pivoted at 9 to a lug 10 on the column. A link 11 is pivoted to the shaft at 12 and to the lever at 13, there being preferably a link at each side of the shaft, taking through an expanded part 14 of the lever. A stop 15, preferably adjustable and shown as a set-screw, takes into the bracket 3 and limits the upward movement of the lever for stopping the table when the material thereon has been raised sufficiently to cause the cutter to pass therethrough. A handle 16 is on the lever for operating the same.

21 is a cutter-frame, shown in the form of a cage, having spiders 22 taking from a central hub 23 and merging into an annular flange 24. The cutter-frame is secured to a shaft 25, as by means of a set-screw 26. The shaft is journaled in bearings 27 27', a collar 28 being secured to the shaft for positioning the same. The shaft has a bevel-pinion 29 secured to it, which meshes with a bevel-wheel 30, journaled on a stud 31 on the bracket 2. A handle 32 on the bevel-wheel, or other means, serves to operate the same.

A ring 35, to which a cutter-blade 36 is secured, is detachably secured to the cutter-frame. Thus the cutter-frame is provided with lugs 37 and the ring with lugs 38, spring-fingers 39 being secured to the lugs 38 and taking over the lugs 37. One or more of these spring-fingers may be provided with a catch 40 for preventing accidental removal of the ring from the cutter-frame. A number of these rings may be provided. The rings are made detachable, so that rings having cutter-blades of different sizes secured thereto may be interchangeably attached to the cutter-frame for cutting the material to different sizes. Thus it may be desirable to trim layers or cakes of, say, eight inches diameter, and to also trim those of different diameter—say seven inches in diameter—and the interchangeability of these rings permits the ready substitution of one size for another. Thus in Fig. 3 we have shown one size of ring and blade in full lines at 35 36 and another in dotted lines at 35' 36'. The cutter-blade is preferably made with clearance for readily withdrawing the material without injury after being cut. Thus the teeth are shown at 41 as projected inwardly, forming a smaller circle than the inner face 42 of the body of the blade. The teeth of the cutter-blade are also rounded, as shown in Fig. 6, so as to trim the cake, which is usually brittle, to a smooth edge. The cutter-frame is provided with an annular shoulder 33 and the ring with a shoulder 34 for centering the ring with relation to the frame.

In order that the blade may pass entirely through the material, we have made the table of such size as to just pass inside the circle of the teeth of the blade of largest diameter. The table is provided with a groove or grooves 43, into which the cutting edges of the blades of smaller diameter take below the surface of the table for passing entirely through the material. The table is provided with ribs 44 for preventing rotation of the material relatively to the table when the cutter enters the same. These ribs may take the form of pins or similar means for retaining the material in position.

A plate 45 is suspended in the cutter-frame and acts as a weight adapted to rest upon the material to be cut before the junction of the cutter-blade with the material for holding the material in place. The plate is so suspended that rotation may not be imparted to it by the cutter-frame. Thus it is shown in Fig. 1 as hung on a chain 46, the chain having swiveling connection at 47 with the top of the cage 21 and swiveling connection 48 with the plate. If desired, the suspending connection of the plate may be by means of a rod 49, attached to the plate, the rod being arranged to take into a hollow 50 of the shaft 25, the rod having a knob 51 at its upper end and the shaft having a flange 52, against which the knob takes for limiting the downward movement of the weight, the connection between the rod and shaft being loose.

Illustrating the operation, the layer or layers or blanks are placed upon the table. The table is then raised. The layers, taking against the plate 45, raise the latter, thereby securely positioning the layers on the table. The cutter-frame is turned, the table being continued to be raised meanwhile, thereby trimming the edges of the layers. As soon as the blade has passed through the layers the table is lowered, the weight stopping at its limit of movement, thereby releasing the layers, which may be taken from the table and others put in their place.

If desired, the table and cutter-frame may be caused to relatively approach automatically by connecting the table with the operating mechanism. Referring to Figs. 7 to 10, inclusive, the bevel-gear 30 is caused to mesh with a bevel-pinion 29$^a$ on a shaft 25$^a$. This shaft is journaled in a bearing 27$^a$ on a bracket 2$^a$, a collar 28$^a$ being secured to the shaft above the bearing. The bevel-wheel 30 is secured to a shaft 31$^a$, journaled in bearings 55 55' of a yoke 56, extending from the bracket 2$^a$, the shaft 31$^a$ having a pinion secured to it, which pinion 57 meshes with a gear 58, secured to a shaft 59. The latter has a collar 60 secured to it, which is journaled in bearing 61, the shaft 59 being journaled in a bearing 61', the bearings 61 61' being in the yoke 56. Endwise movement of the shaft is prevented by having the gear 58 and an enlarged end 62 on the shaft take against the bearings 61 61'. A sleeve 63, forming a spool for the flexible connection hereinafter named, is slidably arranged on the shaft 59. Between the collar 60 and the end of the sleeve adjacent thereto there is a clutch 64, (shown as a tooth-clutch,) the teeth thereof being respectively on the collar and end of the sleeve. The sleeve has an annular groove 65, into which a pin 66 takes for shifting the sleeve sidewardly. This pin is secured to a lever 67. This lever rests upon a ledge 68 of the yoke 56 and is shiftable upon a pivot 69 on said yoke. A flange 70 extends from the lever. A flexible connection 71, which may be rope or cable, is secured at 72 to the sleeve 63 and takes under the sleeve and above the flange 70, and then takes over and is secured at 73 to the smaller step 74 of a differential pulley 75. A tappet 76 is secured to the cable 71 near its sleeve end, and a tappet 77 is secured to it distanced therefrom. These tappets form contacts taking against the flange of the lever. A flexible connection 78, which may be a rope or cable, has one end thereof secured to the larger step 79 of the differential pulley at 80, the other end being secured to the operating-lever, as by being looped thereabout through an eye 81. A recess 82 is provided in the face of the sleeve 63 for receiving the tappet 76, and a recess 83 is provided in the face of the step 74 of the differential pulley 75 for receiving the tappet 77 when said respective tappets are wound about the sleeve and step, respectively.

In operation the bevel-wheel 30 being turned the saw-blade is revolved, and through pinion 57 and gear 58 and the cables 71 78 and their connections the table is caused to be raised for bringing the layers to be cut across the path of the saw. When the table has been sufficiently raised, the tappet 77 strikes the flange 70, thereby swinging the lever 67 upon its pivot, moving the sleeve 63 sidewardly and causing disengagement of the clutch 64, permitting the operator to lower the handle 16 for returning the table to initial position. This movement causes the cable upon the sleeve 63 to unwind, and at the proper moment the tappet 76 strikes the flange 70, thereby throwing the clutch 64 into connection. This mechanism makes it necessary for the operator to employ but one hand at a time in its operation.

The differential pulley is mounted on a shaft 84, supported in bearings 85 on an arm 86, projecting from the bracket 2$^a$.

The layers, blanks, or cakes may be trimmed singly or a number at a time, or the entire cake may be trimmed after it has been filled. These layers when baked usually have oblique edges, according to the form of pan in which they are baked, while after being trimmed the edges are vertically straight, resulting in economy and superior finish of coating.

The machine is simple, and its operation is rapid.

Having thus fully described our invention, what we claim as new, and desire to secure by Letters Patent, is—

1. In a baker's trimmer, the combination of a cutter-frame and table, means for causing relative rotation and reciprocation between the same, and pressure means arranged to take against the material being trimmed and brought into action and moved by said reciprocation.

2. In a baker's trimmer, the combination of a cutter-frame and table, means for permitting their relative rotation and reciprocation, and a cutter-blade on said cutter-frame having its teeth inclined toward its rotary axis.

3. In a baker's trimmer, the combination of a cutter-frame and table, means for permitting their relative rotation and reciprocation, and a cutter-blade on said cutter-frame having teeth provided with rounded cutting edges.

4. In a baker's trimmer, the combination of a cutter-frame and table, means for permitting their relative rotation and reciprocation, a cutter-blade, a support for the same, and means for detachably securing said support to said cutter-frame.

5. In a baker's trimmer, the combination of a cutter-frame, a table, means for relatively rotating and means for relatively reciprocating said cutter-frame and table, and pressure means arranged to take against the material being trimmed and brought into action by said reciprocation.

6. In a baker's trimmer, the combination of a cutter-frame, a table, means for relatively rotating and means for relatively reciprocating said cutter-frame and table, said table having material-retaining projections, and pressure means arranged to take against the material being trimmed and brought into action by said reciprocation.

7. In a baker's trimmer, the combination of a rotatable cutter-frame, a pressure device therein, a table, means for reciprocating said table, interchangeable cutter-supports having cutters thereon, and means for interchangeably securing said supports to said cutter-frame, substantially as described.

8. In a baker's trimmer, the combination of a cutter-frame, means for rotating the same, a cutter on said frame, a pressure-plate swiveled to and suspended in said frame, a table, and means for reciprocating said table, substantially as described.

9. In a baker's trimmer, the combination of a cutter-frame and table, means for relatively rotating and means for causing relative approach of said cutter-frame and table, said means being operatively connected, and pressure means arranged to take against the material being trimmed and brought into action by said approach, substantially as described.

10. In a baker's trimmer, the combination of a cutter-frame and table, a rotating operating device, and connection therefrom to said cutter-frame and table for relatively rotating the same and causing their relative approach, and means automatically causing disconnection in said connection, substantially as described.

11. In a baker's trimmer, the combination of a cutter-frame and table, means causing their relative rotation, a spool operated by said latter means, a clutch releasably securing said previously-named latter means to said spool, and a flexible connection between said spool and table and constructed and arranged for causing relative approach between said cutter-frame and table, substantially as described.

12. In a baker's trimmer, the combination of a cutter-frame, a material-supporting table, means for rotating said cutter-frame, a spool, gearing connecting with said rotating means, a clutch between said gearing and spool, and flexible connection between said spool and table, substantially as described.

13. In a baker's trimmer, the combination of a cutter-frame, a material-supporting table, means for rotating said cutter-frame, a spool, gearing connecting with said rotating means, a clutch between said gearing and spool, flexible connection between said spool and table, and contacts on said flexible connection automatically operating said clutch, substantially as described.

14. In a baker's trimmer, the combination of a cutter-frame, a material-supporting table, means for rotating said cutter-frame, a lever connecting with said table for reciprocating the same, a spool, gearing operated by said rotating means, a clutch between said gearing and spool, flexible connection between said spool and lever, a clutch-lever, and contacts on said flexible connection contacting with said clutch-lever for automatically operating said clutch, substantially as described.

15. In a baker's trimmer, the combination of a rotatable cutter-frame, rotating means for operating the latter, a table, a table-lever having connection with said table, a spool, a clutch between said spool and rotating means, a clutch-lever, a differential pulley, a flexible connection between said differential pulley and said spool, contacts on said flexible connection arranged to take against said clutch-lever for operating said clutch, and a flexible connection between said differential pulley and table-lever, as and for the purpose specified.

16. In a baker's trimmer, the combination of a rotatable cutter-frame, rotating means for operating the latter, a table, a table-lever having connection with said table, a spool, a clutch between said spool and rotating means, a clutch-lever, a differential pulley, a flexible connection between said differential pulley and said spool, contacts on said flexible connection arranged to take against said clutch-lever for operating said clutch, said spool and differential pulley having recesses for said contacts, and a flexible connection between said differential pulley and table-lever, as and for the purpose specified.

17. In a baker's trimmer, the combination of a cutter-frame and table, means for relatively rotating and means for causing relative approach of said cutter-frame and table, and means causing automatic connection and disconnection of said latter means with said first-named means.

18. In a baker's trimmer, the combination of a cage open at the bottom, means for rotating the same, interchangeable cutter-rings having cutters of different diameters thereon, means for interchangeably securing said rings to the bottom of said cage, a swiveling pressure-plate swiveled to and suspended in said cage, a table, and means for reciprocating said table, substantially as described.

In testimony whereof we have signed our names hereto in the presence of two subscribing witnesses.

ALBERT E. SCHUCHERT.
CLEMENS OSKAMP.

Witnesses:
FRED ABEL,
A. F. HERBSLEB.